United States Patent

[11] 3,590,334

[72] Inventor Donal Eugene Baker
3898 Neely Road, Lima, Ohio 45807
[21] Appl. No. 869,266
[22] Filed Oct. 24, 1969
[45] Patented June 29, 1971

[54] STATIC ECONOMIZER CIRCUIT FOR POWER CONTACTORS
3 Claims, 2 Drawing Figs.

[52] U.S. Cl. .......... 317/148.5 R, 307/235, 317/154, 317/DIG. 4, 317/DIG. 5
[51] Int. Cl. .......... H01h 47/10
[50] Field of Search .......... 317/148.5, 159, 123, DIG. 4, DIG. 5; 307/235

[56] References Cited

UNITED STATES PATENTS 3,116,441 12/1963 Gieffers .......... 317/154 X
3,341,748 9/1967 Kammiller .......... 317/DIG. 5

*Primary Examiner*—J. D. Miller
*Assistant Examiner*—Harry E. Moose, Jr.
*Attorneys*—F Shapoe, C L. Menzemer and G. H. Telfer

ABSTRACT: An economizer circuit that can close a power contactor with high current through a relay coil quickly and then go to a state of low holding current with low power dissipation is provided using transistor switching elements of which a first responds to a DC control voltage to turn on when a voltage signal of predetermined polarity and magnitude is applied and at least a second transistor responds to the output current of the first transistor to apply a feedback signal to drive the first transistor rapidly to full saturation. A capacitor charging by the output current of the first transistor controls the period of saturation of the second transistor holding the second transistor on until the capacitor is almost fully charged. During the brief saturation period a pulse of high current is developed through the relay coil to effect accelerated closure of the power contactor. After closure, when the transistors are not in saturation, an economical holding current is provided through the relay coil.

PATENTED JUN 29 1971

3,590,334

WITNESSES:

Bernard R. Gregory

James F. Young

INVENTOR
Donal E. Baker

BY Gordon H. Telfer
ATTORNEY

STATIC ECONOMIZER CIRCUIT FOR POWER CONTACTORS

BACKGROUND OF THE INVENTION

1. Field of the Invention

This invention relates to transistor switching circuits particularly for developing a rapid high current pulse for closing an electromechanical element, as in economizer circuits for power contactors.

2. Description of the Prior Art

Presently used economizer circuits for power contactors are of the mechanically actuated switch type. These devices provide the high level closing current required for fast pickup and low current for economical holding conditions. The mechanical schemes do have undesirable features, however, because extremely close adjusting tolerances must be held on the mechanical switch and there also exist the other usual drawbacks of mechanical elements such as low reliability and susceptibility to vibration and shock.

SUMMARY OF THE INVENTION

Among the objects of this invention are to provide an economizer circuit for power contactors that utilizes solid-state switches to develop the high closing current required for a relay coil with rapid drop to a low current holding mode. Further objects are to have an economizer circuit that closes the power contactor with precision upon application of a predetermined control voltage without being affected by the rate of rise of the control voltage.

These and other objects and advantages of the present invention as will be apparent hereinafter are achieved by the provision of a circuit that includes a pair of control terminals for receiving a DC control voltage with a first transistor connected to the control terminals through level setting impedance elements to initiate turn-on when a signal of predetermined polarity and magnitude is applied to the control terminals. A second transistor is connected to receive the output current from the first transistor and to develop a positive feedback signal to the first transistor for fast, complete saturation. A capacitor controls the saturation time of the second transistor and is charged through the output current of the first transistor and discharged when the control voltage on the pair of control terminals drops below a predetermined turn-on magnitude. Impedances to adjust the charging and discharging time constants of the capacitor are provided so that the second transistor is held in fully saturated condition only for a limited time period, during which an operating coil for a power contactor and connected to the control terminals carries a large closing current which, when the transistors are not in saturation, reduces to a minimal value as limited by an impedance in series with the relay coil.

DESCRIPTION OF THE PREFERRED EMBODIMENTS

Figure 1:
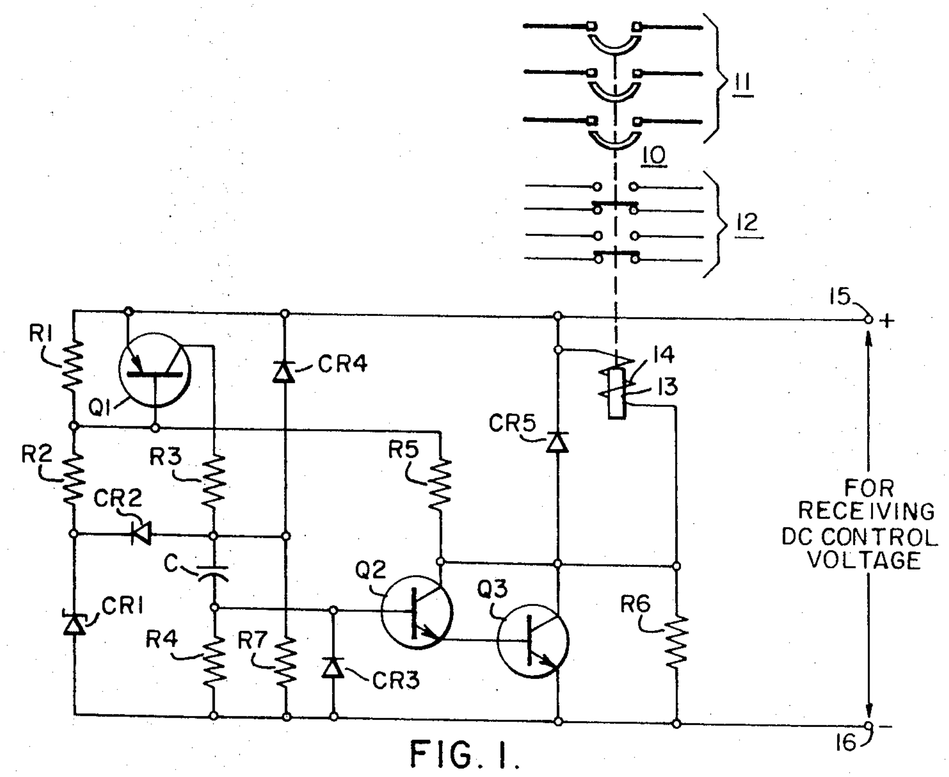
FIGS. 1 and 2 are circuit schematics of embodiments of the present invention.

The embodiment of FIG. 1 includes as an example a power contactor 10 that has three pairs of main contacts 11 shown in an open position and a plurality of auxiliary contacts 12 of which some are shown in an opened position and some are shown in a closed position. The power contactor may be of any of various known types. The circuit of the present invention is particularly useful with power contactors for handling substantial power levels such as in the range from 40 to 120 kva. The circuit of FIG. 1 which is shown by way of example was designed for use in a 120 kva., 115/200 volt, three phase, 400 Hertz electric power system for aircraft use.

The contactor 10 includes a core 13 with a coil 14 around it that upon application of a suitable closing current effects closure of the contactor. The coil 14 is connected across a pair of control terminals 15 and 16 for receiving a DC control voltage. A current limiting impedance, resistor R6, is in series with the coil 14 between the control terminals 15 and 16.

The response of the contactor 10 to a control voltage applied only across the coil 14 and its series impedance R6 would be unreliable without some means to make sure that closure is effected rapidly when the control voltage reaches the predetermined level, and power dissipation would be undesirably high unless after closure only a minimal holding current were provided. These functions are provided by an economizer circuit in accordance with this invention that includes a first transistor Q1 connected with the control terminals 15 and 16. Here the first transistor is a PNP transistor connected with its emitter to the positive control terminal 15, its base connected to the negative control terminal 16 through a resistor R2 and a diode rectifier CR1 of the Zener type. Another resistor R1 is connected between the base and emitter of the transistor Q1. The impedances R1, R2 and CR1 set the level of DC voltage on terminals 15 and 16 at which the transistor Q1 turns on and develops a current between its emitter and collector. The example of the circuit was designed to turn-on at essentially the zener level of CR1, 16V. DC. The resulting current flow of the first transistor Q1 is applied through a large capacitor C to a second transistor Q2 which in this example is combined with a third transistor Q3 to form a Darlington amplifier. Both transistors Q2 and Q3 are NPN transistors. The output of the Darlington amplifier is coupled through a resistance R5 back to the base of the first transistor Q1. This positive current feedback causes the first transistor Q1 to saturate completely almost immediately.

The circuit also includes a capacitor C connected on one side through a resistor R3 to the collector of the first transistor Q1 and connected on the other side to the base of the second transistor Q2. The capacitor C is charged by the collector current developed by the first transistor Q1. Capacitor C is charged when Q1 is saturated by the current developed through resistor R3. This charging current holds the second and third transistors Q2 and Q3 fully on until capacitor C is almost fully charged. The time constant of the charging circuit is selected to give the second and third transistors Q2 and Q3 a limited period of saturation which in the designed circuit was about 0.1 second. During this limited saturation time, approximately the full value of the DC control voltage is applied to the coil of the contactor giving a large holding or closing current effecting rapid closure which in this example is within less than 0.05 second. When the second and third Q2 and Q3 transistors have returned to their normal cutoff mode, the current limiting resistor R6 in series with the coil 14 provides an economical holding current.

Diodes CR3 and CR4 are individually connected from each side of the capacitor C to the DC power terminals 16 and 15, respectively, to provide a low impedance path for discharging the capacitor when the DC control voltage is interrupted. The discharge time of the capacitor C (as determined primarily by the impedance of the discharge path through CR4, the relay coil, R6, and CR3 is faster than the dropout time of the contactor 10 so as to repulse the contactor coil 14 in the event of a short duration transient interruption of the DC control voltage. The result, then, is to give a circuit which will not allow mechanical dropout of the contactor without being reclosed in the event of short duration transients.

A diode CR2 is connected from a point between capacitor C and R3 and a point between CR1 and R2. Diode CR2 prevents the charge on capacitor C from exceeding the voltage level of the Zener diode CR1. This is necessary because (1) it limits the voltage rating of capacitor C and (2) it prevents alternate charging and discharging of capacitor C through R3 due to transient DC control voltage variations above the turn-on level which would cause unnecessary switching of transistors Q2 and Q3.

A diode CR5 is connected from the collectors of Q2 and Q3 to the positive control voltage terminal 15. This diode is used to suppress inductive voltage spikes during current level changes through the relay coil 14. Such spikes occur during shutoff and CR5 will protect transistors Q2 and Q3 from excessive voltage stress.

The following are examples of components suitable for use in the circuit of FIG. 1:

| | |
|---|---|
| Transistor Q1 | 2N2904 |
| Transistor Q2 | 2N2102 |
| Transistor Q3 | 2N3441 |
| Resistors R1 and R2 | 2 k. ohm, 1/2 w. |
| Resistor R3 | 200 ohms, 1 w. |
| Resistors R4 and R7 | 1 k. ohms, 1 w. |
| Resistor R5 | 10 k. ohms, 1/2 w. |
| Resistor R6 | 40 ohms, 25 w. |
| Diode CR1 | 12 v. Zener |
| Diodes CR2, CR3, CR4 and CR5 | 100 microf. |

Figure 2:
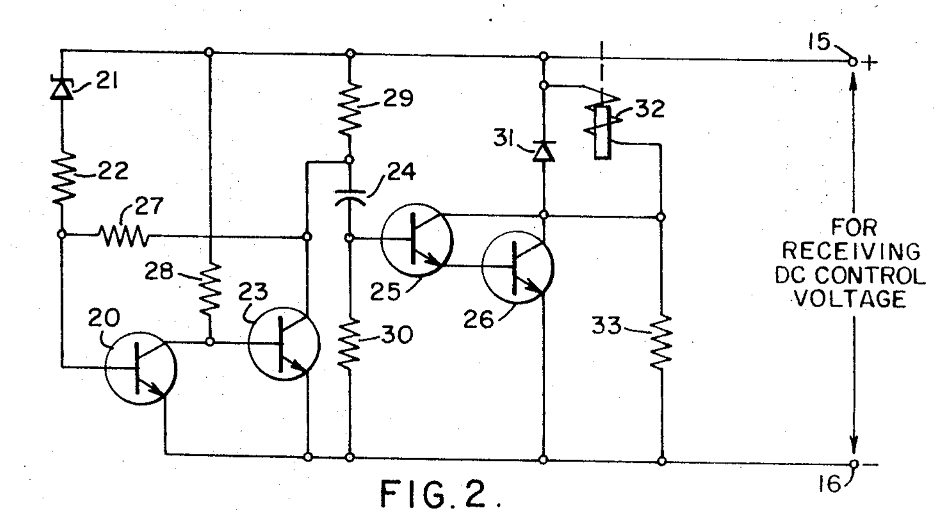

Another embodiment of the invention is illustrated in FIG. 2. In FIG. 2, all of the transistors are of the same polarity, NPN. A first transistor 20 is connected to the positive DC control terminal 15 at its base through level setting impedances including a Zener diode 21 and a resistance 22. In this example, the collector of transistor 20 is connected to the base of transistor 23 whose collector is connected to one side of a capacitor 24. A Darlington amplifier including transistors 25 and 26 is connected in the manner of FIG. 1 to the other side of the capacitor 24.

Other elements of the circuit of FIG. 2 include a resistor 27 connected between the collector of transistor 23 and the base of transistor 20, resistor 28 connected between the collector of transistor 20 and the positive control terminal 15, resistor 29 connected between one side of capacitor 24 and the positive terminal 15, resistor 30 connected between the other side of capacitor 24 and the other control terminal 16, diode 31 connected from the collectors of transistors 25 and 26 to terminal 15, and coil 32 and resistance 33 connected in series between the terminals 15 and 16 with their midpoint connected to the collectors of transistors 25 and 26.

In operation, the circuit of FIG. 2 is less preferred than that of FIG. 1 primarily because it does not include means (exemplified by diodes CR3 and CR4 of FIG. 1) for a fast discharge path for capacitor 24 and it also does not have a capacitor voltage limiting diode (such as CR2 of FIG. 1). Interruption's of the DC control voltage that are shorter than the capacitor discharge voltage will allow the contactor to open without being reclosed, making rapid discharge desirable. Without a capacitor voltage limiting diode, variations in the DC voltage, such as a ripple, could cause sufficient base drive to be applied to transistor 25 causing transistors 25 and 26 to switch at the ripple frequency with increased power dissipation over the circuit of FIG. 1. Otherwise, the function of the circuit of FIG. 2 is similar to that of FIG. 1. When the applied DC voltage reaches the turn-on level, transistor 20 turns on and shuts off transistor 23. Positive feedback via resistor 27 results in quick turn off of transistor 23. When transistor 23 is off, capacitor 24 begins changing and the charging current turns on transistors 25 and 26 until capacitor 24 is almost fully charged. The resulting current pulse through coil 32 causes closure of the contactor.

Components suitable for use in the circuit of FIG. 2 are:

| | |
|---|---|
| Transistors 20, 23 and 25 | 2N2102 |
| Transistor 26 | 2N3441 |
| Diode 21 | 12 v. Zener |
| Diode 31 | 1N4001 |
| Resistors 22 and 28 | 2 k. ohms |
| Resistor 27 | 10 k. ohms |
| Resistor 29 | 200 ohms |
| Resistor 30 | 1 k. ohms |
| Resistor 33 | 40 ohms |
| Capacitor 24 | 100 microf. |

A suitable circuit with essentially the same performance as that of FIG. 2 (i.e., differing from FIG. 1 in the same functional respects) can be provided merely by deleting diodes CR2, CR3, CR4 and their connections from the circuit of FIG. 1.

While the invention has been shown and described in a few forms only, it will be apparent that various changes and modifications may be made without departing from its true scope.

I claim:

1. An economizer circuit, suitable for closing a power contactor and maintaining the contactor closed with low power dissipation, comprising: a pair of control terminals for receiving a DC control voltage; a first transistor connected with said pair of control terminals through at least one level setting impedance element to turn-on and develop an output current when a voltage signal of predetermined polarity and magnitude appears at said pair of control terminals; at least a second transistor connected to receive output current from said first transistor and to develop an amplified output current applied through a feedback impedance back to said first transistor for fast, complete saturation of said first transistor; a capacitor connected to be charged by the output current of said first transistor and discharged when control voltage on said pair of control terminals drops below a predetermined level; impedance means to control charging and discharging time constants of said capacitor so said at least a second transistor is held in a fully saturated condition for a first time period; an operating coil for a power contactor, said coil connected to said pair of control terminals for carrying a closing current of a first magnitude when said at least a second transistor is in saturation; a current limiting impedance in series with said coil between said pair of control terminals for limiting current therethrough to a second magnitude less than said first magnitude when said at least a second transistor is not in saturation.

2. The subject matter of claim 1 further comprising: first and second diodes connected respectively from each side of said capacitor to one of said control terminals to provide a rapid discharge path for said capacitor.

3. The subject matter of claim 2 further comprising a third diode connected from one side of said capacitor to a circuit point adjacent said at least one level setting impedance element to limit voltage across said capacitor and reduce circuit sensitivity to any ripple as may appear in said DC control voltage.